United States Patent Office  
3,636,035  
Patented Jan. 18, 1972

3,636,035
STABILIZED MOULDING COMPOSITIONS FROM POLYMERS OF α-OLEFINS
Otto Mauz, Niederhofheim, Taunus, and Eberhard Prinz, Kelkheim, Taunus, Germany, assignors to Farbwerke Hoechst Aktiengesellschaft, Frankfurt am Main, Germany
No Drawing. Filed July 7, 1969, Ser. No. 839,712
Claims priority, application Germany, July 10, 1968, P 17 69 764.2
Int. Cl. C08f 45/58
U.S. Cl. 260—45.95   4 Claims

ABSTRACT OF THE DISCLOSURE

Moulding compositions from polyolefins and a stabilizer mixture which is difficult to extract by boiling water consisting of a phosphorus containing bisphenol and a disulfide.

The present invention relates to stabilized moulding compositions from polymers of α-olefins.

It has been proposed to use various compounds and classes of compounds to stabilize plastics against an accelerated aging by the action of oxygen, epecially at elevated temperatures or in the presence of light. Thus, for improving the resistance to aging of polyolefins, phenol derivatives, aromatic amines, substituted amino phenols or organic sulfides, the organic radicals of which may be of aromatic and advantageously aliphatic nature, are for example used.

The efficiency of some stabilizers can be considerably improved by simultaneously adding compounds of stabilizer classes of different nature.

Such synergistic systems have the advantage that in general their efficiency is much higher than the sum of the efficiencies of the individual stabilizer components. Although a large number of synergistic mixtures have been proposed in the course of time, it cannot be predicted whether determined stabilizer mixtures have a synergistic effect.

It is known from German Pat. 1,188,799 that bisphenol alkanoic acid esters are very efficient anti-oxidants for polyolefins which considerably excel most of the phenolic stabilizers. These compounds, however, have the disadvantage that they have a tendency to discoloration at elevated temperatures, particularly in the presence of oxygen. For this reason they can be added only in relatively low concentrations in the case of light coloured mixtures, so that their efficiency is not yet sufficient for stabilizing polyolefins for all applications.

It is also known from Belgain Pat. 604,245 that polyolefins can be stabilized by a combination of usual phenolic antioxidants with thio-dipropionic acid esters and organic phosphites. Although this known combination improves the stabilization it is not sufficient for plastics to be used for washing machine and dish washing machine pieces or hot water pipes. By the hot water, the stabilizers are dissolved out from the plastics to a large extent or chemically changed, for example saponified.

Now, we have found that moulding compositions of polyolefins and a stabilizer mixture consisting of components (a) and (b), which have excellent properties, can be obtained by using, as component (a), a bis-phenol containing phosphorus of the general formula

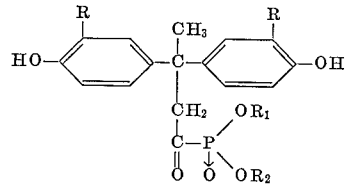

in an amount within the range of from 0.005 to 5% by weight calculated on the polyolefin, and as component (b) a sulfur compound of the general formula

in an amount within the range of from 0.005 to 5% by weight, calculated on the polyolefin, in which formulae R represents a hydrogen atom or an alkyl group with 1 to 4 carbon atoms, $R_1$ and $R_2$ are identical or different alkyl radicals with 2 to 20 carbon atoms or a phenyl group and $R_3$ and $R_4$ are alkyl radicals with 8 to 20 carbon atoms, and the mixing ratio of the components (a) and (b) is within the range of from 1:9 to 9:1 parts by weight.

The combination of the invention has the particular advantage that the stabilizers can be extracted by boiling water only with difficulty. This stabilizer combination is, therefore, particularly suitable for stabilizing plastics which are used for one-way milk bottles, houseware, washing and dish washing machine pieces which come into contact with washing liquors, for hot water pipes and fibres.

The stabilizers used in accordance with the invention are obtained by the addition reaction of secondary aliphatic or aromatic phosphites with diketenes in the presence of catalysts. The dialkoxy-phosphono-2,4-dioxobutanes so obtained are condensed under acid conditions with phenol or alkyl phenols at temperatures within the range of from 0° to 30° C.

For the addition to diketenes the following secondary phosphites may, for example, be used: diethyl-, dipropyl-, dibutyl-, diamyl-, dioctyl-, dinonyl-, didodecyl-, dioctadecyl- and diphenyl phosphites.

For the subsequent condensation there may be used, for example, phenol, cresol, 2-isopropyl-phenol, 2-sec. butyl-phenol, 2-tert.butyl-phenol.

As component (b) in the mixtures used as stabilizers according to the invention, di(dodecyl)-disulfide and di-(octadecyl)-disulfide are preferably used.

The polyolefins to be stabilized in accordance with the invention are especially those containing tertiary carbon atoms. Polyolefins of this type are preferably those which, owing to the nature of the monomer, already contain side chains and, consequently, tertiary carbon atoms. Examples include polypropylene, polybutylene and poly-4-methylpentene. Low density polyethylene and high density polyethylene containing side chains which may be short or long, as a result of side reactions may also be stabilized in accordance with the invention. The polypropylene which is advantageously stabilized by the process in accordance with the invention, is manufactured like high density polyethylene for example, with the known Ziegler low pressure polymerization catalysts described, for example, by Raff-Allison in "Polyethylene," pages 72 to 81.

The stabilizers may be admixed with the polyolefins together or successively while advantageously using a mixture consisting of a high amount of stabilizer and a small amount of polyolefin. For this purpose, a concentrated solution of the stabilizers is mixed in a low-boiling solvent, for example acetone or methylene chloride, with a small amount of the pulverulent polymerization product to be stabilized in a ratio such that the mixture contains about 30 to 40% by weight of stabilizer after evaporation of the solvent.

By proceeding in this manner, a dry powder is obtained which may be incorporated in usual manner in the polymer to be stabilized to obtain the desired concentration of stabilizer in the finished mass. The stabilizers may of course also be incorporated during the manufacturing process of the polymerization products or their working up. This mode of working has the particular advantage that the polymer is protected against the action of light and atmospheric oxygen, especially at elevated temperatures, already in an early stage, i.e. during the manufacturing process or the working up. The polyolefins so stabilized may be further worked according to the known forming processes, i.e. compression, injection-moulding and extrusion.

The following example serves to illustrate the invention but is not intended to limit it:

EXAMPLE 100 grams of a polypropylene powder to be stabilized were mixed with a 5% solution of the stabilizers indicated in the following tables in a quantitative ratio such that the stabilizer concentration calculated on polypropylene was five-times the amount of the stabilizer concentration indicated in the following tables. After drying at 80° C. in vacuo the stabilized polypropylene was thoroughly mixed with 400 grams of unstabilized powder and the mixture then granulated at 200° C. in a Battenfeld laboratory extruder. The test granular product was then injection-mounded at 275° C. in an Arburg injection-moulding automate to yield small plates 1 millimeter thick.

From each injection-moulded plate several test strips each 10 millimeters large and 100 millimeters long were cut and immersed in a vessel through which running water of 90° C. flowed. After 4 weeks the test strips were withdrawn and freely suspended at 140° C. in a circulating air drying cabinet to determine the stability against oxidation. The time of embrittlement of the test strips was taken as a measure for their stability against oxidation. The time of embrittlement was herein the time in days after which the test strips stored at 140° C. broke when being bent through 180° or began to disintegrate in the form of powder.

The aging test at elevated temperatures in a circulating air drying cabinet is carried out under much severer conditions than in a normal drying cabinet without circulating air because of the continuous air circulation and fresh air inlet.

TABLE 1.—COMBINATION IN ACCORDANCE WITH THE INVENTION

| No. | Stabilizers | Concentration, percent by weight | Time of embrittlement in days at 140° C. |
|---|---|---|---|
| 1 | 3,3-bis-(4'-hydroxy-3-tert.butyl-phenyl)-butane-1-phosphonic acid didodecylester. | 0.1 | 40 |
|  | Di(octadecyl)disulfide | 0.25 |  |
| 2 | 3,3-bis(4'-hydroxy-3'-tert.butyl-phenyl)-butane-1-phosphonic acid dioctylester. | 0.1 | 31 |
|  | Di(dodecyl)disulfide | 0.25 |  |
| 3 | 3,3-bis(4'-hydroxy-3'-sec.butyl-phenyl)-butane-1-phosphonic acid diphenyl ester. | 0.1 | 29 |
|  | Di(octadecyl)disulfide | 0.25 |  |
| 4 | 3,3-bis(4'-hydroxy-3'-tert.butyl-phenyl)-butane-1-phosphonic acid dioctadecyl ester. | 0.1 | 42 |
|  | Di(octadecyl)disulfide | 0.25 |  |

TABLE 2.—COMPARISON TESTS, INDIVIDUAL COMPONENTS

| No. | Stabilizers | Concentration, percent by weight | Time of embrittlement in days at 140° C. |
|---|---|---|---|
| 5 | 3,3-bis(4'-hydroxy-3'-tert.butyl-phenyl)-butane-1-phosphonic aicd didodecyl ester. | 0.3 | 18 |
| 6 | 3,3-bis(4'-hydroxy-3'-tert.butyl-phenyl)-butane-1-phosphonic acid dioctyl ester. | 0.3 | 15 |
| 7 | 3,3-bis(4'-hydroxy-3'-sec. butyl-phenyl)-butane-1-phosphonic acid diphenyl ester. | 0.3 | 12 |
| 8 | 3,3-bis(4'-hydroxy-3'-tert.butyl-phenyl)-butane-1-phosphonic acid dioctadecyl ester. | 0.3 | 18 |
| 9 | Di(dodecyl)disulfide | 0.3 | 2 |
| 10 | Di(octadecyl)disulfide | 0.3 | 2 |
| 11 | Dioctadecyl phosphite | 0.3 | (¹) |
| 12 | Trioctadecyl phosphite | 0.3 | (¹) |
| 13 | Diphenyl phosphite | 0.3 | (¹) |

¹ Test plate brittle after some hours.

TABLE 3.—COMPARISON TESTS, COMBINATION NOT IN ACCORDANCE WITH THE INVENTION

| No. | Stabilizers | Concentration, percent by weight | Time of embrittlement in days at 140° C. |
|---|---|---|---|
| 14 | 3,3-bis(4'-hydroxy-3-tert.butyl-phenyl)-butyric acid-dodecyl ester. | 0.1 | 17 |
|  | Di(octadecyl)disulfide | 0.25 |  |
|  | Trioctadecylphosphite | 0.5 |  |
| 15 | 4,4-bis(4-hydroxy-phenyl) pentanoic acid dodecyl ester. | 0.1 | 14 |
|  | Di(octadecyl)disulfide | 0.25 |  |
|  | Tridodecyl phosphite | 0.5 |  |
| 16 | 3,3-bis(4-hydroxy-3-sec.butyl-phenyl)-butyric acid-phenyl ester. | 0.1 | 4 |
|  | Di(octadecyl)disulfide | 0.25 |  |
|  | Triphenyl phosphite | 0.5 |  |

Tests 1 to 16 were carried out according to the method described above.

The stabilizers were incorporated in the polypropylene powder via a solution, the stabilized plates were immersed for 4 weeks in running water of 98° C. and then brittled at 140° C. in a circulating air drying cabinet.

Table 1 shows the values obtained for the stabilizer combinations used in accordance with the invention. Table 2 shows the times of embrittlement of the individual components. Table 3 shows the comparison tests of combinations of 3 components according to German Pat. 1,224,924.

Tables 1 and 2 show that the phosphorus containing phenols (tests 5 to 8) have a stabilizing effect which is, however, extraordinarily improved by the addition of a dialkyl disulfide because of synergistic effect (tests 1 to 4). The disulfides alone are substantially inefficient (tests 9 and 10), the test plates containing only phosphite as stabilizer were completely brittle after a few hours of heat treatment in the circulating air drying cabinet (tests 11 to 13).

The comparison examples (tests 14 to 16) according to German Pat. 1,224,924 also show that the combinations of 3,3 - bis(4' - hydroxy-3'-alkyl-phenyl)-butane-1-phosphonic acid dialkyl ester and dialkyl disulfide are superior to the mixtures of the 3 components of bisphenol alkanoic acid esters, dialkyl disulfides and phosphites.

What is claimed is:

1. A moulding composition of polyolefins containing tertiary carbon atoms and a stabilizer mixture composed of components (a) and (b), in which as component (a) a phosphorus containing bisphenol of the general formula

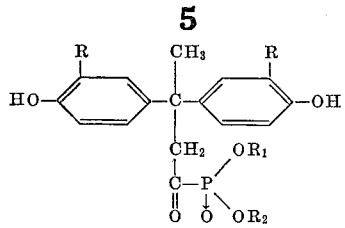

is used in an amount within the range of from 0.005 to 5% by weight calculated on the polyolefin, and as component (b) a sulfur compound of the general formua

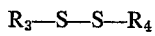

also in an amount within the range of from 0.005 to 5% by weight calculated on the polyolefin, in which formulae R represents a hydrogen atom or an alkyl group with 1 to 4 carbon atoms, $R_1$ and $R_2$ represent identical or different alkyl radicals with 2 to 20 carbon atoms or a phenyl radical and $R_3$ and $R_4$ represent an alkyl radical with 8 to 20 carbon atoms, and the mixing ratio of the components (a) and (b) is within the range of from 1:9 to 9:1 parts by weight.

2. A moulding composition as claimed in claim 1, wherein a compound selected from the group consisting of di(dodecyl)-disulfide and di(octadecyl)-disulfide is used as component (b).

3. A moulding composition as claimed in claim 1, wherein a polymer selected from the group consisting of polypropylene, polybutylene and poly-4-methyl-pentene is used as polyolefin.

4. A shaped article manufactured from the moulding composition of claim 1.

References Cited
UNITED STATES PATENTS

| | | | |
|---|---|---|---|
| 2,900,408 | 8/1959 | Blazer et al. | 260—946 |
| 2,956,919 | 10/1960 | Baker et al. | 260—946 |
| 3,070,940 | 12/1962 | Saul et al. | 260—946 |
| 3,413,381 | 11/1968 | Cyba | 260—946 |
| 3,526,679 | 9/1970 | Strauss | 260—45.95 |

DONALD E. CZAJA, Primary Examiner

V. P. HOKE, Assistant Examiner

U.S. Cl. X.R.

260—45.7 P, 45.7 S, 45.85